(12) United States Patent
Bolton (10) Patent No.: US 7,372,906 B2
(45) Date of Patent: May 13, 2008

(54) COMPRESSION CIRCUITRY FOR GENERATING AN ENCODED BITSTREAM FROM A PLURALITY OF VIDEO FRAMES

(75) Inventor: Martin Bolton, Bristol (GB)

(73) Assignee: STMicroelectronics Limited, Almondsbury, Bristol (GB)

( * ) Notice: Subject to any disclaimer, the term of this patent is extended or adjusted under 35 U.S.C. 154(b) by 783 days.

(21) Appl. No.: 10/391,442

(22) Filed: Mar. 17, 2003

(65) Prior Publication Data

US 2003/0231710 A1 Dec. 18, 2003

(30) Foreign Application Priority Data

Mar. 18, 2002 (EP) .................. 02251932

(51) Int. Cl.
  *H04N 7/12* (2006.01)
  *H04N 11/02* (2006.01)
  *H04N 11/04* (2006.01)
  *H04B 1/66* (2006.01)

(52) U.S. Cl. .................. 375/240.2
(58) Field of Classification Search .......... None
  See application file for complete search history.

(56) References Cited

U.S. PATENT DOCUMENTS

| | | | |
|---|---|---|---|
| 5,768,433 A * | 6/1998 | Bolton | 382/238 |
| 6,091,857 A | 7/2000 | Shaw et al. | 382/251 |
| 6,104,751 A | 8/2000 | Artieri | 375/240 |
| 6,788,740 B1 * | 9/2004 | van der Schaar et al. | 375/240 |
| 6,842,484 B2 * | 1/2005 | Gandhi et al. | 375/240.24 |
| 7,015,921 B1 * | 3/2006 | Trivedi et al. | 345/557 |
| 7,075,986 B2 * | 7/2006 | Girod et al. | 375/240.12 |
| 2001/0033617 A1 | 10/2001 | Karube et al. | 375/240.12 |

OTHER PUBLICATIONS

European Search Report, EP 02251932, dated Sep. 17, 2002.

* cited by examiner

*Primary Examiner*—Nhon Diep
(74) *Attorney, Agent, or Firm*—Gardere Wynne Sewell LLP (57) ABSTRACT

Data is discrete cosine transformed and streamed to a processor where quantized and inverse quantized blocks are generated. A second streaming data connection streams the inverse quantized blocks to an inverse discrete cosine transform block to generate reconstructed prediction error macroblocks. An addition circuit adds each reconstructed prediction error macroblock and its corresponding predictor macroblock to generate a respective reconstructed macroblock. The quantized macroblocks are zig-zag scanned, run level coded and variable length coded to generate and encoded bitstream.

30 Claims, 6 Drawing Sheets

COMPRESSION CIRCUITRY FOR GENERATING AN ENCODED BITSTREAM FROM A PLURALITY OF VIDEO FRAMES

PRIORITY CLAIM

This application claims priority from European Application for Patent No. 02251932.6 filed on Mar. 18, 2002, the disclosure of which is hereby incorporated by reference.

BACKGROUND OF THE INVENTION

1. Technical Field of the Invention

The present invention relates to motion picture compression circuits for pictures such as television pictures, and more particularly to a compression circuit complying with H.261 and MPEG standards.

2. Description of Related Art

Figure 1A:
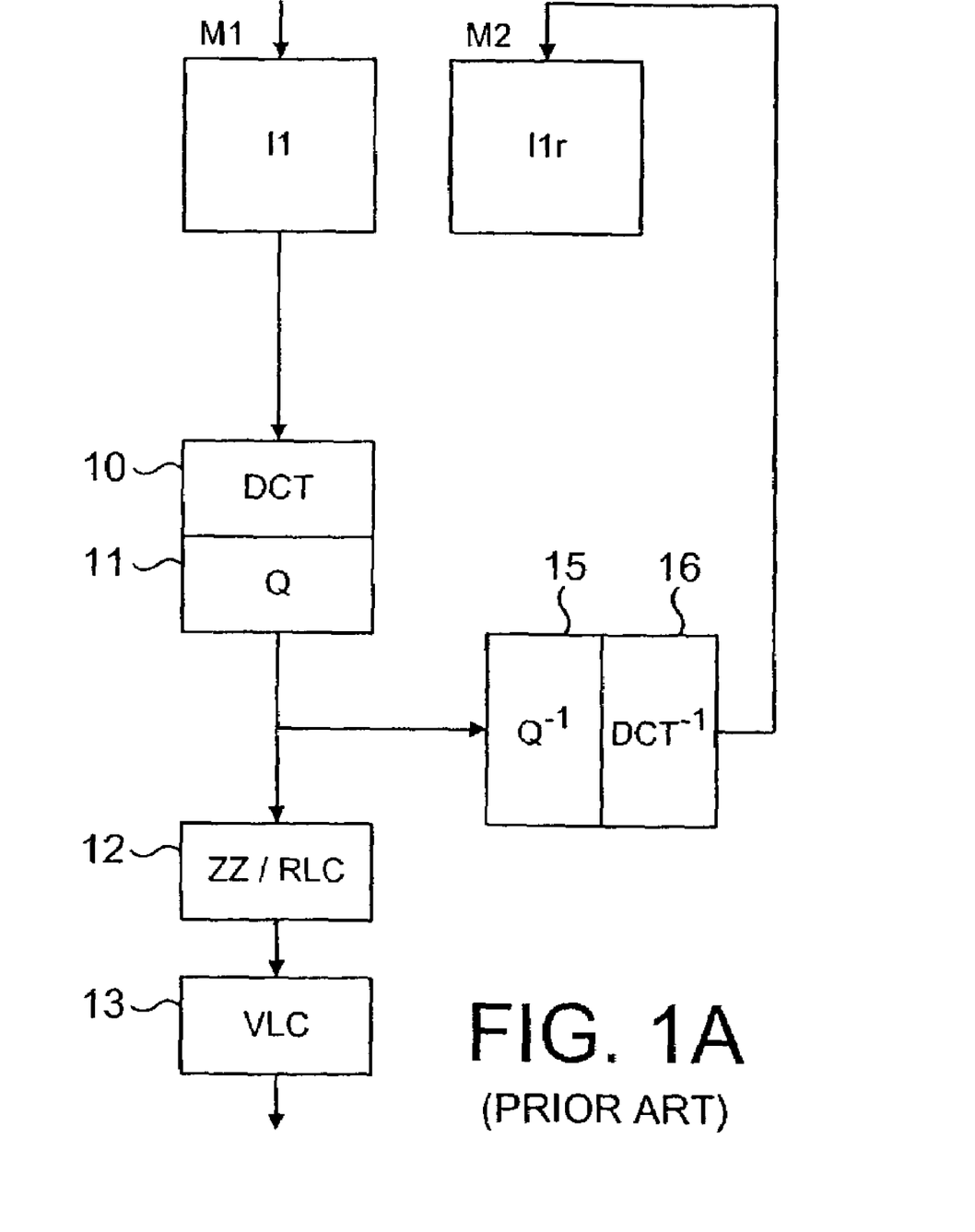
FIGS. 1A to 1C, previously described, illustrate three picture compression processes according to H.261 and MPEG standards, in accordance with the prior art.
Figure 1B:
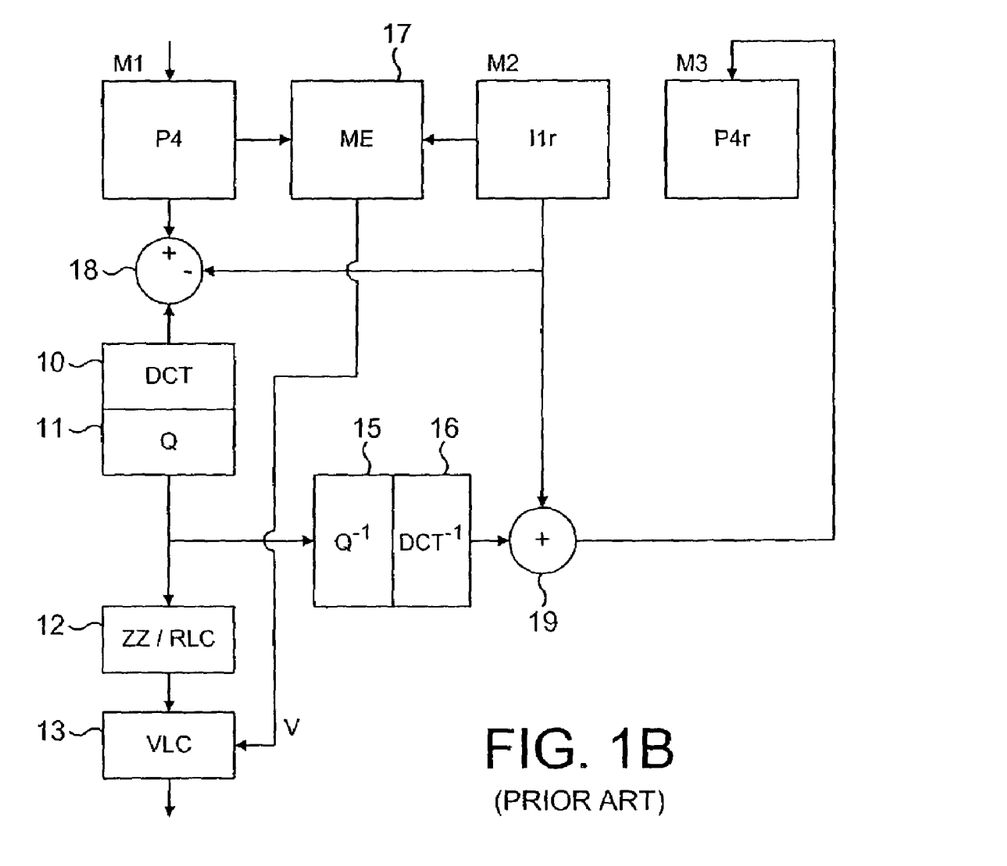
Figure 1C:
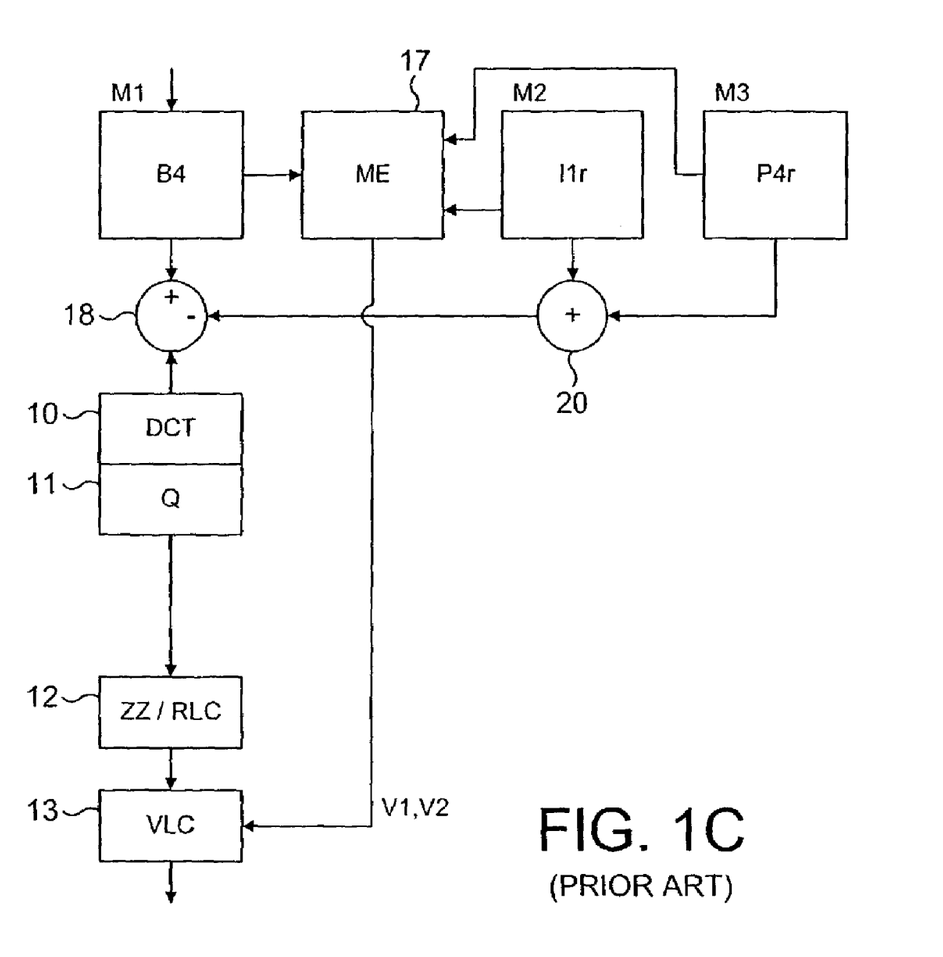

FIGS. 1A-1C schematically illustrate three methods for compressing motion pictures in accordance with H.261 and MPEG standards. According to H.261 standards, pictures may be of intra or predicted type. According to MPEG standards, the pictures can also be of bidirectional type.

Intra ("I") pictures are not coded with reference to any other pictures. Predicted ("P") pictures are coded with reference to a past intra or past predicted picture. Bidirectional ("B") pictures are coded with reference to both a past picture and a following picture.

FIG. 1A illustrates the compression of an intra picture I1. Picture I1 is stored in a memory area M1 before being processed. The pictures have to be initially stored in a memory since they arrive line by line whereas they are processed square by square, the size of each square being generally 16 by 16 pixels. Thus, before starting to process picture I1, memory area M1 must be filled with at least 16 lines.

The pixels of a 16 by 16-pixel square are arranged in a so-called "macroblock". A macroblock includes four 8 by 8-pixel luminance blocks and two or four 8 by 8-pixel chrominance blocks. The processes hereinafter described are carried out by blocks of 8 by 8 pixels.

The blocks of each macroblock of picture I1 are submitted at 10 to a discrete cosine transform (DCT) followed at 11 by a quantization (Q). A DCT transforms a matrix of pixels (a block) into a matrix whose upper left corner coefficient tends to have a relatively high value. The other coefficients rapidly decrease as the position moves downwards to the right. Quantization involves dividing the coefficients of the matrix so transformed, such that a large number of coefficients which are a distance away from the upper left corner are cancelled.

At 12, the quantified matrices are subject to zigzag scanning (ZZ) and to run/level coding (RLC). Zigzag scanning has the consequence of improving the chances of consecutive series of zero coefficients, each of which is preceded by a non-zero coefficient. The run/level coding mainly includes replacing each series from the ZZ scanning with a pair of values, one representing the number of successive zero coefficients and the other representing the first following non-zero coefficient.

At 13, the pairs of values from the RLC are subject to variable length coding (VLC) that includes replacing the more frequent pairs with short codes and replacing the less frequent pairs with long codes, with the aid of correspondence tables defined by the H.261 and MPEG standards. The quantification coefficients can be varied from one block to the next by multiplication by a quantization coefficient. That quantization coefficient is inserted during variable length coding in headers preceding the compressed data corresponding to macroblocks.

Macroblocks of an intra picture are used to compress macroblocks of a subsequent picture of predicted or bidirectional type. Thus, decoding of a predicted or bidirectional picture is likely to be achieved from a previously decoded intra picture. This previously decoded intra picture does not exactly correspond to the actual picture initially received by the compression circuit, since this initial picture is altered by the quantification at 11. Thus, the compression of a predicted or intra picture is carried out from a reconstructed intra picture I1 rather than from the real intra picture I1, so that decoding is carried out under the same conditions as encoding.

The reconstructed intra picture I1$r$ is stored in a memory area M2 and is obtained by subjecting the macroblocks provided by the quantification 11 to a reverse processing, that is, at 15 an inverse quantification ($Q^{-1}$) followed at 16 by an inverse DCT ($DCT^{-1}$).

FIG. 1B illustrates the compression of a predicted picture P4. The predicted picture P4 is stored in a memory area M1. A previously processed intra picture I1$r$ has been reconstructed in a memory area M2.

The processing of the macroblocks of the predicted picture P4 is carried out from so-called predictor macroblocks of the reconstructed picture I1$r$. Each macroblock of picture P4 (reference macroblock) is subject to motion estimation (ME) at 17 (generally, the motion estimation is carried out only with the four luminance blocks of the reference macroblocks).

This motion estimation includes searching in a window of picture I1$r$ for a macroblock that is nearest, or most similar to the reference macroblock. The nearest macroblock found in the window is the predictor macroblock. Its position is determined by a motion vector V provided by the motion estimation. The predictor macroblock is subtracted at 18 from the current reference macroblock. The resulting difference macroblock is subjected to the process described with relation to FIG. 1A.

Like the intra pictures, the predicted pictures serve to compress other predicted pictures and bidirectional pictures. For this purpose, the predicted picture P4 is reconstructed (P4$r$) in a memory area M3 by an inverse quantification at 15, inverse DCT at 19, and addition at 19 of the predictor macroblock that was subtracted at 18.

The vector V provided by the motion estimation 17 is inserted in a header preceding the data provided by the variable length coding of the currently processed macroblock.

FIG. 1C illustrates the compression of a bidirectional picture B2. Bidirectional pictures are provided for in MPEG standards only. The processing of the bidirectional pictures differs from the processing of predicted pictures in that the motion estimation 17 consists in finding two predictor macroblocks in two pictures I1$r$ and P4$r$, respectively, that were previously reconstructed in memory areas M2 and M3. Generally, pictures I1$r$ and P4$r$ respectively correspond to a picture preceding the bidirectional picture that is currently processed and to a picture following the bidirectional picture.

At 20, the mean value of the two obtained predictor macroblocks is calculated and is subtracted at 18 from the currently processed macroblock.

The bidirectional picture is not reconstructed because it is not used to compress another picture.

The motion estimation 17 provides two vectors V1 and V2 indicating the respective positions of the two predictor macroblocks in pictures I1r and P4r with respect to the reference macroblock of the bidirectional picture. Vectors V1 and V2 are inserted in a header preceding the data provided by the variable length coding of the currently processed macroblock.

In a predicted picture, an attempt is made to find a predictor macroblock for each reference macroblock. However, in some cases, using the predictor macroblock that is found may provide a smaller compression rate than that obtained by using an unmoved predictor macroblock (zero motion vector), or even smaller than the simple intra processing of the reference macroblock. Thus, depending upon these cases, the reference macroblock is submitted to either predicted processing with the vector that is found, predicted processing with a zero vector, or intra processing.

In a bidirectional picture, an attempt is made to find two predictor macroblocks for each reference macroblock. For each of the two predictor macroblocks, the process providing the best compression rate is determined, as indicated above with respect to a predicted picture. Thus, depending on the result, the reference macroblock is submitted to either bidirectional processing with the two vectors, predicted processing with only one of the vectors, or intra processing.

Thus, a predicted picture and a bidirectional picture may contain macroblocks of different types. The type of a macroblock is also data inserted in a header during variable length coding. According to MPEG standards, the motion vectors can be defined with an accuracy of half a pixel. To search a predictor macroblock with a non integer vector, first the predictor macroblock determined by the integer part of this vector is fetched, then this macroblock is submitted to so-called "half-pixel filtering", which includes averaging the macroblock and the same macroblock shifted down and/or to the right by one pixel, depending on the integer or non-integer values of the two components of the vector. According to H.261 standards, the predictor macroblocks may be subjected to low-pass filtering. For this purpose, information is provided with the vector, indicating whether filtering has to be carried out or not.

The succession of types (intra, predicted, bidirectional) is assigned to the pictures in a predetermined way, in a so-called group of pictures (GOP). A GOP generally begins with an intra picture. It is usual, in a GOP, to have a periodical series, starting from the second picture, including several successive bidirectional pictures, followed by a predicted picture, for example of the form IBBPBBPBB . . . where I is an intra picture, B a bidirectional picture, and P a predicted picture. The processing of each bidirectional picture B is carried out from macroblocks of the previous intra or predicted picture and from macroblocks of the next predicted picture.

Figure 2:
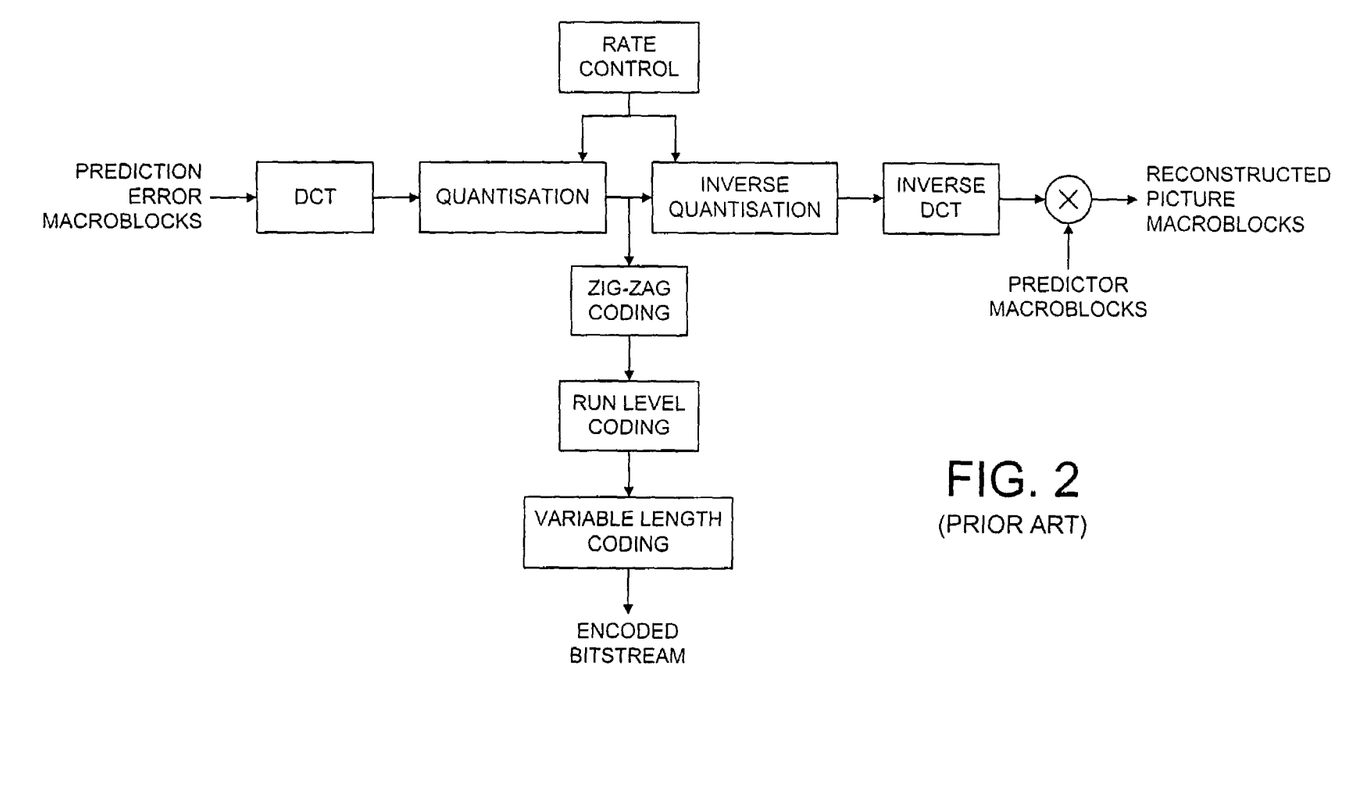
FIG. 2, previously described, is a schematic of the functional blocks in a typical MPEG encoding scheme, in accordance with the prior art.

The various functional blocks that are used in a typical prior art functional implementation are shown in FIG. 2. For clarity, the motion estimation engine and memory for storing macroblocks and video pictures have been omitted.

In FIG. 2, a reference macroblock is supplied to a subtraction circuit, where the predictor for that macroblock is subtracted (in the case of B and P pictures, only). The resultant error block (or the original macroblock, for I pictures) is passed on to a DCT block then to a quantization block for quantization.

The quantized macroblock is forwarded to an encoding process and an inverse quantization block. The encoding process takes the quantized macroblock and zig-zag encodes it, performs run level coding on the resultant data, then variable length packs the result, outputting the now encoded bitstream.

The bitstream is monitored and can be controlled via feedback to a rate control system. This controls quantization (and dequantization) to meet certain objectives for bitstream. A typical objective is a maximum bit-rate, although other factors can also be used.

The inverse quantization block in FIG. 2 is the start of a reconstruction chain that is used to generate a reconstructed version of each frame, so that the frames the motion prediction engine is searching for matching macroblocks are the same as will be regenerated during decoding proper. After inverse quantization, the macroblock is inverse DCT transformed in IDCT block and added to the original predictor used to generate the error macroblock. This reconstructed block is stored in memory for subsequent use in the motion estimation process.

The various blocks required to generate the encoded output stream have different computational requirements, which themselves can vary according to the particular application or user selected restrictions. Throttling of the output bitstream to meet bandwidth requirements is typically handled by manipulating the quantization step.

Pure hardware architectures, while potentially the most efficient, suffer from lack of flexibility since they can support only a restricted range of standards; moreover they have long design/verification cycles. On the other hand, pure software solutions, while being the most flexible, require high-performance processors unsuited to low-cost consumer applications.

It would be desirable to provide an architecture that allowed for relatively flexible bitstream control while reducing the amount of software-based processing power required.

SUMMARY OF THE INVENTION

According to one embodiment of the present invention, there is provided compression circuitry for generating an encoded bitstream from a plurality of video frames, the circuitry including:

discrete cosine transform (DCT) circuitry for accepting prediction error macroblocks and generating DCT transformed macroblocks;

a first streaming data connection for streaming the DCT transformed macroblocks from the DCT transformation circuitry to a processor, the processor being configured to run software for:

(i) quantizing the DCT transformed macroblocks to generate quantized macroblocks; and (ii) inverse quantizing the quantized macroblocks to generate inverse quantized macroblocks;

a second streaming data connection for streaming the inverse quantized macroblocks from the processor;

inverse discrete cosine transform (IDCT) circuitry for accepting the streamed inverse quantized macroblocks and IDCT transforming them to generate reconstructed prediction error macroblocks;

an addition circuit for adding each reconstructed prediction error macroblock and its corresponding predictor macroblock, thereby to generate a respective reconstructed macroblocks for use in encoding of other macroblocks; and means for zig-zag scanning, run level coding and variable length coding the quantized macroblocks to generate an encoded bitstream.

Preferably, the DCT and IDCT circuitry perform DCT and IDCT processing at a rate determined by the arrival of data from the relevant data connection.

Preferably, the first and second streaming data connections are handshake controlled. More preferably, the DCT and IDCT circuitry perform DCT and IDCT processing at a rate determined by the handshake control signals.

In a preferred form, the processor is configured to run software for implementing the zig-zag scanning and run length coding.

Preferably also, the DCT and IDCT circuitry share hardware. It is particularly preferred that the DCT and IDCT circuitry comprise a single functional block selectively operable in a DCT or IDCT mode.

In a preferred form, the compression circuitry further includes a motion estimation engine for supplying the predictor macroblocks to the IDCT circuitry. More preferably, the motion estimation engine is configured to generate the prediction error macroblocks by subtracting predictor macroblocks from respective corresponding picture macroblocks of the picture being encoded, and to supply the prediction error macroblocks to the DCT circuitry.

In a preferred embodiment, the circuitry includes a hardware VLC packer and a third streaming data connection for streaming the run length coded data from the processor to the hardware VLC packer.

Preferably, the compression circuitry further includes macroblock memory for storing the reconstructed macroblocks.

It is particularly preferred that the compression circuitry can be configured for decoding of a compressed video stream.

In another embodiment, the present invention provides a method of generating an encoded bitstream from a plurality of video frames, the method including the steps of:

discrete cosine transforming prediction error macroblocks to generate DCT transformed macroblocks;

streaming the DCT transformed macroblocks from the DCT transformation circuitry to a processor via a first streaming data connection;

in the processor:
  (i) quantizing the DCT transformed macroblocks to generate quantized macroblocks; and
  (ii) inverse quantizing the quantized macroblocks to generate inverse quantized macroblocks;

streaming the inverse quantized macroblocks from the processor via a second streaming data connection;

inverse discrete cosine transforming (IDCT) the streamed inverse quantized macroblocks to generate reconstructed prediction error macroblocks;

adding each reconstructed prediction error macroblock and its corresponding predictor macroblock, thereby to generate a respective reconstructed macroblocks for use in encoding of other macroblocks; and zig-zag scanning, run level coding and variable length coding the quantized macroblocks to generate an 30 encoded bitstream.

Preferably, the DCT and IDCT processing take place at a rate determined by the arrival of data from the relevant data connection.

Preferably, the first and second streaming data connections are handshake controlled. More preferably, the step of DCT and IDCT processing at a rate determined by the handshake control signals.

Preferably, the processor is configured to run software for implementing the zig-zag scanning and run length coding.

Preferably, the DCT and IDCT circuitry share hardware. More preferably, the DCT and IDCT circuitry comprise a single functional block selectively operable in a DCT or IDCT mode.

Preferably, the method further includes the step of receiving, in the IDCT circuitry, the predictor macroblocks from a motion estimation engine. More preferably, the method includes the step, in the motion estimation engine, of generating the prediction error macroblocks by subtracting predictor macroblocks from respective corresponding picture macroblocks of the picture being encoded, and supplying the prediction error macroblocks to the DCT circuitry.

In a preferred form, the circuitry includes a hardware VLC packer, the method including the step of streaming the run length coded data from the processor to the hardware VLC packer via a third streaming data connection.

Preferably, the reconstructed macroblocks are stored in macroblock memory.

In each aspect of the invention, it is preferred that the encoded bitstream conforms to MPEG, MPEG-2 and/or H.261 standards.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 3:
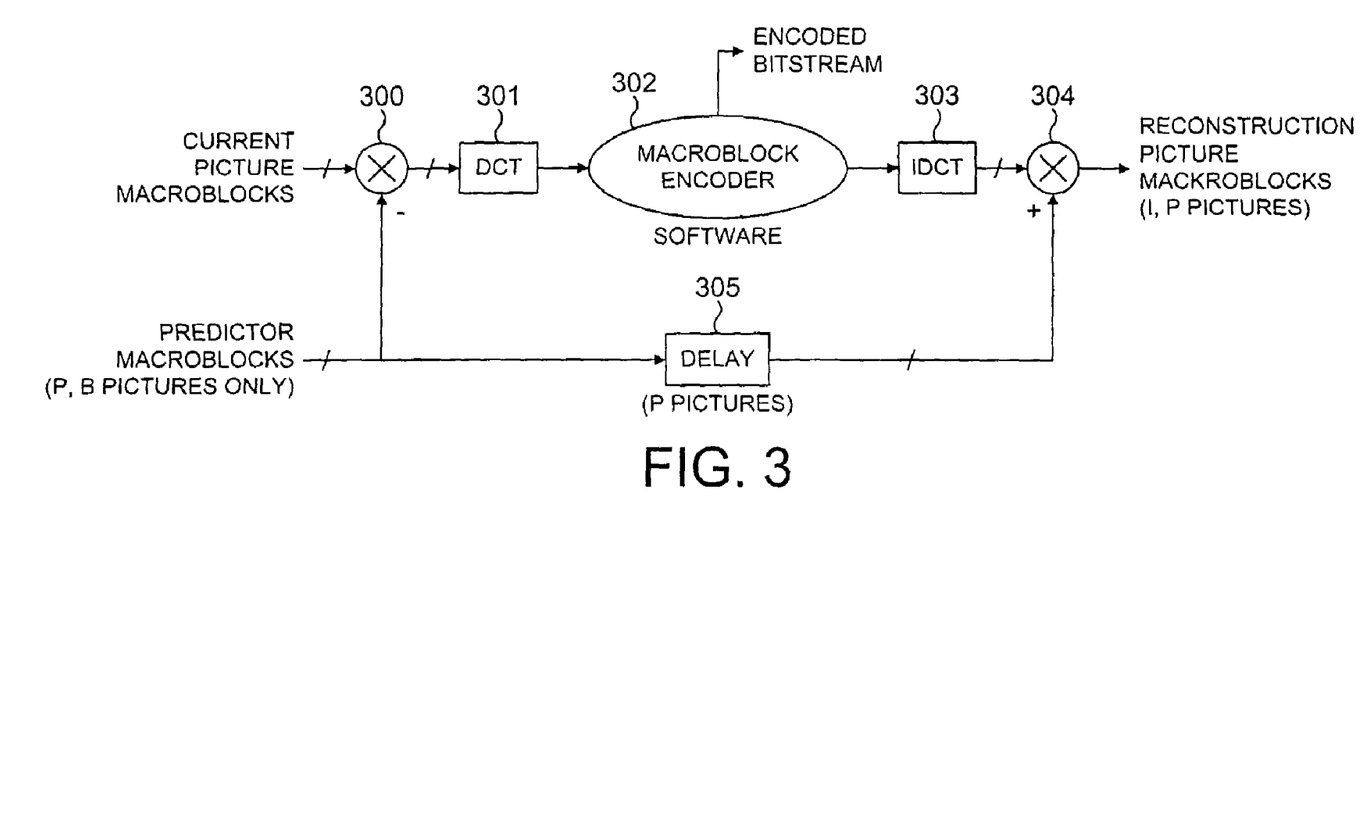
FIG. 3 is a schematic of an encoder loop.

FIG. 3 shows an overview of the functional blocks of one embodiment of the present invention, in which hardware functionality is represented by rectangular blocks and software functionality is represented by an oval block.

The functional blocks include a subtraction circuit 300 for subtracting each predictor macroblock, as supplied by the motion estimation engine (described later) from its corresponding picture macroblock, to generate a prediction error macroblock. For an I picture, there is no predictor, so the macroblock is passed through the subtraction circuit with no change.

The prediction error macroblock is supplied to a DCT circuit 301 where a forward discrete cosine transform (DCT) is performed. Such hardware and its operation are well known in the prior art and will not be described here in further detail.

The output of the DCT is streamed to a processor 302 (described later) which performs the quantization, zig zag coding, a run level coding steps in the encoding process. The resultant data is variable length coded and output as an encoded bitstream. In the simplified schematic of FIG. 3, the variable length coding takes place in software. However, in an alternative embodiment described later, the variable length coding and packing, or just packing, is performed in hardware, since this provides a drastic increase in performance compared to software coding running on a general purpose processor.

The processor 302 also performs inverse quantization ($Q^{-1}$), and the resultant inverse quantized macroblocks are sent to an inverse DCT (IDCT) circuit 303 via a streaming interface. An inverse DCT (IDCT) is performed and the resultant reconstructed error macroblock is added to the original predictor macroblock (for P and B pictures only) by an addition circuit 304. The predictor macroblocks have been delayed in a delay buffer 305. For I and P pictures, the macroblock is fully reconstructed after the IDCT circuit. The resultant reconstructed macroblocks are then stored in memory for use by the motion estimation engine in generating predictors for future macroblocks. This is necessary because it is reconstructed macroblocks that a decoder will subsequently use to reconstruct the pictures.

Figure 4:
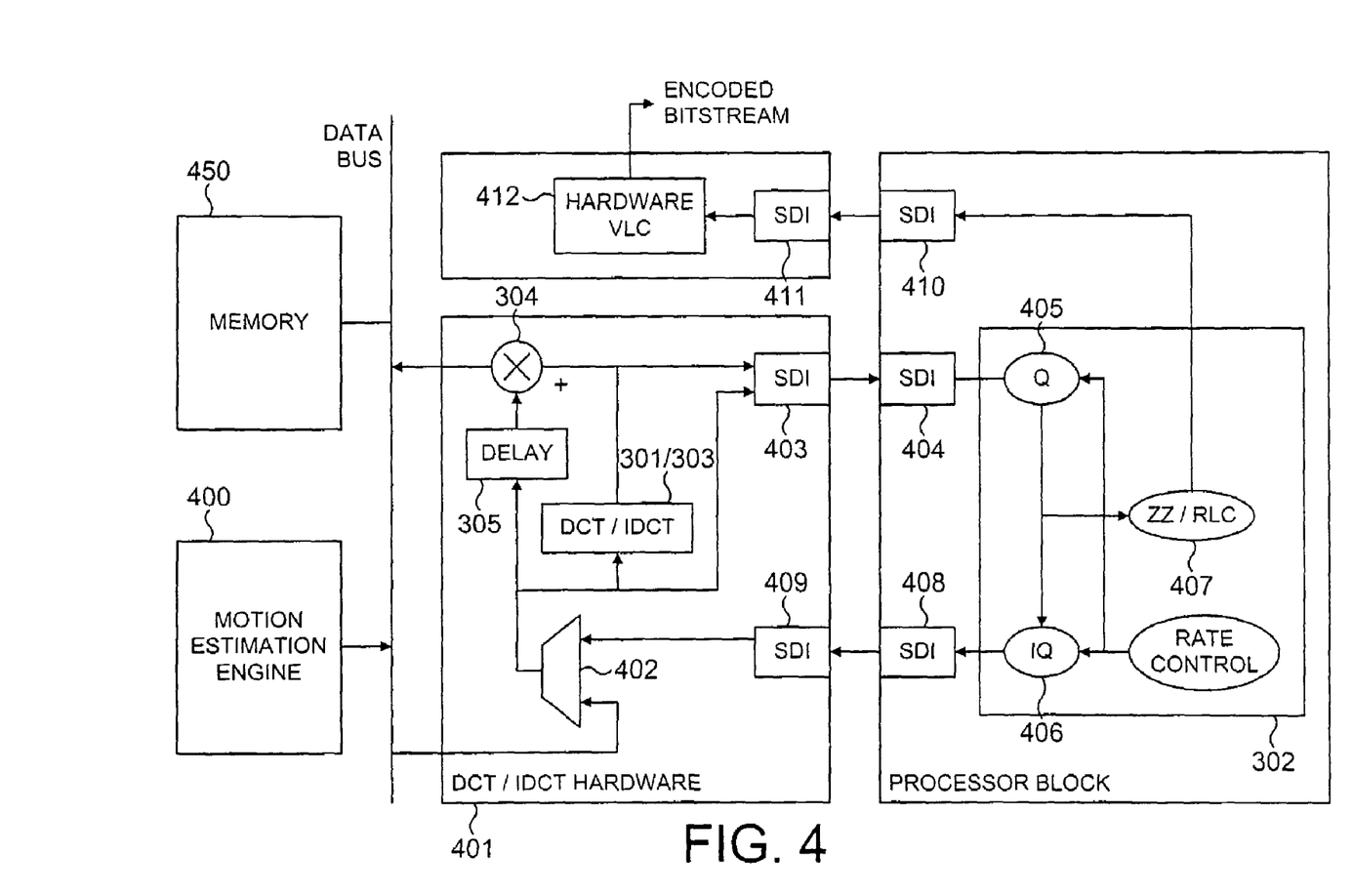
FIG. 4 is a schematic of compression circuitry for generating an encoded bitstream from a plurality of video frames.

FIG. 4 shows a more detailed version of the embodiment of FIG. 3, and like features are denoted by corresponding reference numerals. In FIG. 4, the motion estimation engine 400 for use with the encoding circuitry is also shown. The motion estimation engine 400 determines the best matching macroblock (or average of two macroblocks) for each macroblock in the frame (for B and P pictures only) and subtracts it from the macroblock being considered to generate a predictor error macroblock. The method of selecting predictor macroblocks is not a part of the present invention and so is not described in greater detail herein.

The motion estimation engine 400 outputs the macroblocks, associated predictor macroblocks and vectors, and other information such as frame type and encoding modes, to DCT/IDCT circuitry via a direct link. Alternatively, this information can be transferred over a data bus. Data bus transfer principles are well known and so is not described in detail.

The DCT and IDCT steps are performed in a DCT/IDCT block 401, which includes combined DCT/IDCT circuitry 301/303 that is selectable to perform either operation on incoming data. The input is selected by way of a multiplexer 402, the operation of which will be described in greater detail below. The output of the multiplexer is supplied to the delay block 305 and the DCT/IDCT circuitry 301/303. Additional data supplied by the motion estimation engine 400, such as the motion vector(s), encoding decisions (intra/non-intra, MC/no MC, field/frame prediction, field/frame DCT) is routed past the delay and DCT/IDCT blocks to a first streaming data interface SDI 403.

The outputs of the delay block and the DCT/IDCT circuitry are supplied to an addition circuit 304, the output of which is sent to memory 450. The output of the DCT/IDCT block 301/303 is also supplied to the first SDI port 403.

The first SDI port 403 accepts data from the DCT/IDCT block 301/303 and the multiplexer 402 and converts it into a format suitable for streaming transmission to a corresponding second streaming SDI port 404. The streaming is controlled by a handshake arrangement between the respective SDI ports. The second streaming SDI port 404 takes the streaming data from the first SDI port 403 and converts it back into a format suitable for use within the processor 302.

Once the data has been transformed back into a synchronous format, the processor performs quantization 405, inverse quantization 406 and zig-zag/run level coding 407 as described previously. It will be appreciated that the particular implementations of these steps in software is not relevant to the present invention, and so is not described in detail.

After inverse quantization, the macroblock is returned to a third SDI port 408, which operates in the same way as the first streaming port to convert and stream the data to a fourth SDI port 409, which converts the data for synchronous use and supplies it to the multiplexer 402.

The processor 302 outputs the run level coded data to a fifth SDI port 410, which in a similar fashion to the first and third SDI ports, formats the data for streaming transmission to a sixth SDI port 411, which in turn reformats the data into a synchronous format. The data is then variable length coded and packed in hardware VLC circuitry 412. The particular workings of the hardware VLC packing circuitry 412 are well known in the art, are not critical to the present invention and so will not be described in detail. Indeed, as mentioned previously, the VLC operation can be performed in software by the processor, for a corresponding cost in processor cycles.

It will be appreciated that a number of control lines and ancillary detail has been omitted for clarity. For example, it is clear the multiplexer and DCT/IDCT block 301/303 need to be controlled to ensure that the correct data is being fed to the DCT/IDCT block and that the correct operation is being performed. For example, when the initial DCT operation 301 is being performed, the multiplexer 402 is controlled to provide data from the bus (supplied by the motion estimation engine) to the DCT/IDCT block 301/303, which is set to DCT mode. However, when performing the IDCT operation 303, the multiplexer 402 sends data from the fourth SDI port 409 to the DCT/IDCT block 301/303, which is set to IDCT mode.

Similarly, some support hardware that would exist in the actual implementation has been omitted. An obvious example is buffers on the various inputs and output. It would be usual in such circuitry to include FIFO buffers supporting the SDI ports to maximize throughput. For the purposes of clarity, such support hardware is not explicitly shown. However, it will be understood by those skilled in the art to be implicitly present in any practical application of the invention.

It will be appreciated that, in the encoding mode described above, the DCT and IDCT functions of the DCT/IDCT block 301/303 will be performed in an interleaved manner, with one or more DCT operations being interleaved with one or more IDCT operations, depending upon the order of I, P and B pictures being encoded.

With slight modifications to control software and circuitry, the encoding circuitry described above can perform decoding of an encoded MPEG stream. This is because the inverse quantization software and IDCT hardware are common to the encoding and decoding process. There are at least three ways this can be achieved:

Option 1. If it is only required to offload the IDCT processing from the processor, the dequantized coefficient blocks can be streamed from the processor to the IDCT/DCT block 301/303 via the third and fourth SDI ports 408 and 409. The results of the IDCT are then read back via the first and second SDI ports 403 and 404.

Option 2. Option 1 can be extended to allow more of the decoding load to be passed to the DCT/IDCT block 401. In particular, the predictor blocks are read into the delay buffer 305. The coefficient blocks are then read in via the same route by the DCT/IDCT block 301/303 (in IDCT 30 mode). After the IDCT has taken place, the predictor and IDCT processed macroblocks are combined by the addition circuitry 304 and written to system memory via the system data bus.

Option 3. In an alternative to option 2, the motion estimation block is configured to provide the predictor blocks to the delay buffer 305 via the multiplexer 402. The coefficient blocks are provided to the DCT/IDCT block 301/303 (in IDCT mode), and the remainder of the procedure is as per the second decoding arrangement.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A video compression circuit for generating an encoded bitstream from a plurality of video frames, the circuit comprising:
    a discrete cosine transform (DCT) circuit for accepting prediction error macroblocks and generating DCT transformed macroblocks;
    a first streaming data connection for streaming the DCT transformed macroblocks from the DCT transformation circuit to a processor, the processor being configured to run software for:
        quantizing the DCT transformed macroblocks to generate quantized macroblocks; and
        inverse quantizing the quantized macroblocks to generate inverse quantized macroblocks;
    a second streaming data connection for streaming the inverse quantized macroblocks from the processor to an inverse discrete cosine transform (IDCT) circuit, wherein the IDCT circuit transforms the inverse quantized macroblocks to generate reconstructed prediction error macroblocks;
    an addition circuit for adding a reconstructed prediction error macroblock and a corresponding predictor macroblock, thereby generating respective reconstructed macroblocks for use in the encoding of other macroblocks; and
    means for zig zag scanning, run level coding and variable length coding the quantized macroblocks to generate an encoded bitstream.

2. The compression circuit according to claim 1, wherein the DCT and IDCT circuits perform DCT and IDCT processing at a rate determined by the arrival of data from the relevant data connection.

3. The compression circuit according to claim 1, wherein the first and second streaming data connections are handshake controlled.

4. The compression circuit according to claim 3, wherein the DCT and IDCT circuits perform DCT and IDCT processing at a rate determined by the handshake control signals.

5. The compression circuit according to claim 1, wherein the means for zig-zag scanning and run length coding is the processor configured to run software for implementing the zig zag scanning and run length coding, and the means for variable length coding is a hardware VLC packer.

6. The compression circuit according to claim 5, further comprising a third streaming data connection for streaming the run length coded data from the processor to the hardware VLC packer.

7. The compression circuit according to claim 1, wherein the DCT and IDCT circuits share hardware.

8. The compression circuit according to claim 7, wherein the DCT and IDCT circuits comprise a single functional block selectively operable in a DCT or IDCT mode.

9. The compression circuit according to claim 1, further comprising a motion estimation engine for supplying the prediction error macroblocks to the DCT circuit.

10. The compression circuit according to claim 9, wherein the motion estimation engine is configured to generate the prediction error macroblocks by subtracting the corresponding predictor macroblocks from respective corresponding picture macroblocks of a picture being encoded, and to supply the prediction error macroblocks to the DCT circuit.

11. The compression circuit according to claim 1, further comprising a macroblock memory for storing the reconstructed macroblocks.

12. The compression circuit according to claim 1, wherein the circuit is configured for decoding of a compressed video stream by streaming the inverse quantized macroblocks from the processor to the IDCT circuit and back via the first and second streaming data connection.

13. The compression circuit according to claim 12, wherein the circuit is further configured for decoding of a compressed video stream by storing the corresponding predictor macroblocks in a delay buffer, streaming the inverse quantized macroblocks to the IDCT circuit via the second streaming data connection, wherein the IDCT circuit processes the inverse quantized macroblocks, and combining the corresponding predictor macroblocks and the IDCT processed macroblocks in the addition circuit.

14. The compression circuit according to claim 13, wherein a motion estimation engine provides the corresponding predictor macroblocks to the delay buffer.

15. The compression circuit according to claim 1, wherein the circuit is configured to generate an encoded bitstream in accordance with MPEG, MPEG 2 and/or H.261 standards.

16. A method of generating an encoded bitstream from a plurality of video frames, the method comprising the steps of:
    generating DCT transformed macroblocks by applying prediction error macroblocks to a discrete cosine transform (DCT) circuit;
    streaming the DCT transformed macroblocks from the DCT circuit to a processor via a first streaming data connection;
    in the processor:
    quantizing the DCT transformed macroblocks to generate quantized macroblocks; and
    inverse quantizing the quantized macroblocks to generate inverse quantized macroblocks;
    streaming the inverse quantized macroblocks from the processor via a second streaming data connection to an inverse discrete cosine transforming (IDCT) circuit;
    generating reconstructed prediction error macroblocks by applying the inverse quantized macroblocks to the IDCT circuit;
    adding the reconstructed prediction error macroblocks and corresponding predictor macroblocks to generate respective reconstructed macroblocks for use in the encoding of other macroblocks; and
    generating an encoded bitstream by zig zag scanning, run level coding and variable length coding the quantized macroblocks.

17. The method according to claim 16, wherein the steps of generating the DCT transformed macroblocks and generating the reconstructed prediction error macroblocks take place at a rate determined by the arrival of data from the relevant data connection.

18. The method according to claim 16, wherein the first and second streaming data connections are handshake controlled.

19. The method according to claim 18, wherein the steps of generating the DCT transformed macroblocks and generating the reconstructed prediction error macroblocks take place at a rate determined by the handshake control signals.

20. The method according to claim 16, wherein the step of generating the encoded bitstream by zig-zag scanning and run length coding the quantized macroblocks is performed by the processor configured to run software for implementing the zig zag scanning and run length coding.

21. The method according to claim 20, wherein the step of generating the encoded bitstream by variable length coding (VLC) comprises the step of streaming the run length coded data from the processor to a hardware VLC packer via a third streaming data connection.

22. The method according to claim 16, wherein the steps of generating the DCT transformed macroblocks and generating the reconstructed prediction error macroblocks take place in the same hardware.

23. The method according to claim 22, wherein the steps of generating the DCT transformed macroblocks and generating the reconstructed prediction error macroblocks further comprise selecting either the DCT or the IDCT circuit via a control circuit.

24. The method according to claim 16, further comprising the step of receiving, in the DCT circuit, the prediction error macroblocks from a motion estimation engine.

25. The method according to claim 24, wherein the motion estimation engine performs the steps of:
   generating the prediction error macroblocks by subtracting the corresponding predictor macroblocks from respective corresponding picture macroblocks of a picture being encoded; and
   applying the prediction error macroblocks to the DCT circuit.

26. The method according to claim 16, further comprising the step of storing the reconstructed macroblocks in a macroblock memory.

27. The method according to claim 16, further comprising the step of decoding a compressed video stream by streaming the inverse quantized macroblocks from the processor to the IDCT circuit and back to the processor via the first and second streaming data connections.

28. The method according to claim 27, wherein the step of decoding the compressed video stream further comprises the steps of:
   storing the corresponding predictor macroblocks in a delay buffer;
   streaming the inverse quantized macroblocks from the processor to the IDCT circuit via the second streaming data connection, wherein the IDCT circuit processes the inverse quantized macroblocks; and
   adding the corresponding predictor macroblocks and the IDCT processed macroblocks.

29. The method according to claim 28, further comprising the step of receiving, in the delay buffer, the corresponding predictor macroblocks from a motion estimation engine.

30. The method according to claim 16, wherein the step of generating an encoded bitstream comprises generating an encoded bitstream that conforms to MPEG, MPEG-2 and/or H. 261 standards.

* * * * *